(12) United States Patent
Evans, Jr. et al.

(10) Patent No.: US 9,689,347 B2
(45) Date of Patent: Jun. 27, 2017

(54) ENGINE GENERATING ENERGY THROUGH PHYSICAL AND CHEMICAL ENERGY CONVERSIONS OF A COMPRESSED GASEOUS FUEL

(71) Applicants: Charles A. Evans, Jr., Foster City, CA (US); Michael D. Strathman, San Jose, CA (US)

(72) Inventors: Charles A. Evans, Jr., Foster City, CA (US); Michael D. Strathman, San Jose, CA (US)

( * ) Notice: Subject to any disclaimer, the term of this patent is extended or adjusted under 35 U.S.C. 154(b) by 135 days.

(21) Appl. No.: 14/106,490

(22) Filed: Dec. 13, 2013

(65) Prior Publication Data

US 2014/0250891 A1  Sep. 11, 2014

Related U.S. Application Data

(60) Provisional application No. 61/776,734, filed on Mar. 11, 2013.

(51) Int. Cl.
| | |
|---|---|
| *F01B 21/04* | (2006.01) |
| *F02M 21/06* | (2006.01) |
| *F02M 21/02* | (2006.01) |
| *F02D 29/06* | (2006.01) |
| *F02D 19/02* | (2006.01) |

(52) U.S. Cl.
CPC ............. *F02M 21/06* (2013.01); *F02D 29/06* (2013.01); *F02M 21/0212* (2013.01); *F02D 19/022* (2013.01); *Y02T 10/32* (2013.01)

(58) Field of Classification Search
CPC ........ F02D 29/06; F02D 19/022; F01B 21/04; F02M 21/06; F02M 21/0212; Y02T 10/32; Y02T 10/34
USPC .................................................... 60/698, 670
See application file for complete search history.

(56) References Cited

U.S. PATENT DOCUMENTS

| | | | |
|---|---|---|---|
| 1,515,933 A | 11/1924 | Crowder | |
| 3,680,305 A * | 8/1972 | Miller | ............................. 60/611 |
| 3,945,200 A | 3/1976 | Wright | |
| 4,465,033 A | 8/1984 | Blaser | |
| 6,141,956 A * | 11/2000 | Iijima | ................... F22B 1/1815 122/7 R |
| 6,247,316 B1 * | 6/2001 | Viteri | ............................. 60/716 |
| 2008/0022686 A1 * | 1/2008 | Amdall | .................... B60K 6/12 60/716 |
| 2013/0167532 A1 * | 7/2013 | Parenti | ............................ 60/645 |
| 2013/0174555 A1 * | 7/2013 | Gruber et al. | ................... 60/698 |
| 2013/0319359 A1 * | 12/2013 | Evans | ...................... B60K 6/24 123/1 A |
| 2014/0174086 A1 * | 6/2014 | Kare et al. | ........................ 60/670 |

* cited by examiner

*Primary Examiner* — Phutthiwat Wongwian
*Assistant Examiner* — Kelsey Stanek
(74) *Attorney, Agent, or Firm* — Haverstock & Owens LLP

(57) ABSTRACT

An engine for propelling vehicles on land, in the air and on the water. The engine is able to extract energy from a same fuel twice, including extracting a first amount of energy with a gas turbine and a second amount of energy by burning the fuel in a combustion engine.

33 Claims, 5 Drawing Sheets

ENGINE GENERATING ENERGY THROUGH PHYSICAL AND CHEMICAL ENERGY CONVERSIONS OF A COMPRESSED GASEOUS FUEL

CROSS-REFERENCE TO RELATED APPLICATION(S)

This application claims priority under 35 U.S.C. §119(e) of the U.S. Provisional Patent Application Ser. No. 61/776,734, filed Mar. 11, 2013 and titled, "NOVEL ENGINE USING COMPRESSED GAS OF A FUEL AND AN INTERNAL COMBUSTION ENGINE," which is also hereby incorporated by reference in its entirety for all purposes.

FIELD OF THE INVENTION

The present invention relates to engines. More specifically, the present invention relates to engines that use the physical property and chemical property of a fuel to power a vehicle or a machine.

BACKGROUND OF THE INVENTION

Since the early 1900s, most cars and trucks in the United States have been propelled using gasoline or diesel powered engines. In recent years, hybrid electric and pure electric powered vehicles have entered the fleet. There are two types of hybrids. One couples the power from the internal combustion engine to an alternator to charge the batteries and also to the drive train via mechanical ways. The batteries drive an electric motor which then also mechanically couples its power to the drive train. The alternative hybrid mechanism uses what is called the "locomotive" method. As in diesel locomotive engines, the fuel is used to generate electricity which then drives electric motors for powering the drive wheels.

Brazil has led the way in the use of neat ethanol powered vehicles. In France it is common to see gas stations offering liquefied petroleum gas (LPG) in addition to normal petroleum gasoline. The LPG is cryogenically stored at the delivery point and in the vehicle and the driver selects the traditional gasoline or the LPG. Countries from Turkey east to South Korea also use gasoline and liquefied natural gas (LNG) to power many of their vehicles.

In France, the vehicle has two tanks for the two different fuels. A user can merely turn a knob or switch to go from one fuel to the other. For both fuels, they are burned in a traditional internal combustion (IC) engine without the hybrid mechanism gaining momentum in North America.

There are research groups working on an approach using a compressed and non-combustible liquid/gas, such as liquid nitrogen, $LN_2$. The expanded pressurized non-combustible gas is then used to drive a motor which is coupled to the drive wheels. One of the problems is frosting and icing due to energy required to compensate for the latent heat of vaporization. FIG. 1 shows a typical engine 100 powered by a compressed non-combustible liquid/gas. The engine 100 contains a fuel storage 102. A compressed and non-combustible liquid/gas 104 is stored within the fuel storage 102. By expanding the non-combustible liquid/gas 104 at a turbo expander or heat exchanger 106, a high pressure gas 110 is produced at the chamber 108. The high pressure gas 110 is used to propel a motor 112.

In all of the above instances, energy is extracted only once from the fuel, either by fuel combustion or the compressed inert gas.

SUMMARY OF THE INVENTION

Methods of and devices for twice extracting energy from a fuel are disclosed. The methods and devices comprise turning a turbine or an expansion cylinder by using an expanded gas/liquid from a compressed, liquified, or solidified gas and then combusting/burning the gas/liquid in an internal/external combustion engine. The methods and devices disclosed herein are able to be used to provide power to a land, water or air vehicle. The dual power sources are able to drive an alternator/generator for producing electricity and/or storing it in a battery array, and driving the vehicle.

The methods and devices disclosed herein are able to be used as a propulsion and/or auxiliary power on land transportation vehicles (such as, a car, pick-up, SUV, hybrid vehicle), public transport vehicles (such as shuttles, buses, light rail, underground systems (e.g, subways)), land transportations for transporting gases, liquids and solids (such as the commonly named truck, "18 wheeler") on streets, roads, highways, and interstate highways, land transportation of people and goods (such as, vehicles on rails and a train propelled by a locomotive), transportation of people and/or goods on or under water (such as, a boat, ferry, hydrofoil, catamaran or submarine), and transportation of goods and/or people above the ground in the air (such as, an airplane or jet aircraft). In the following some aspects of the invention are disclosed.

In an aspect, a vehicle comprises a fuel storage, a fluid driven generator fluidically coupling with the fuel storage, and a chemical energy converter fluidically coupling with the fluid driven generator. In some embodiments, the fluid driven generator comprises one or more turbines. In other embodiments, the fluid driven generator generates electricity when receiving a fluid flow. In some other embodiments, the fluid flow comprises a gas. In some embodiments, the fluid flow is driven by a pressure difference. In other embodiments, the fluid driven generator, the chemical energy converter, or a combination thereof provides an energy sufficient to move the vehicle. In some other embodiments, the chemical energy converter comprises a combustion engine. In some embodiments, the combustion engine makes a moving motion of the vehicle by combusting a fuel. In other embodiments, the vehicle comprises a land transportation vehicle. In some other embodiments, the land transportation vehicle comprises a sedan, a pick-up, a SUV, or a hybrid vehicle. In some embodiments, the land transportation vehicle comprises a truck or a train. In other embodiments, the vehicle comprises a public transportation vehicle. In some other embodiments, the public transportation vehicle comprises a shuttle, a bus, or a light rail train. In some embodiments, the public transportation vehicle comprises an underground system. In other embodiments, the underground system comprises a subway. In some other embodiments, the vehicle comprises a vehicle on water or under water. In some embodiments, the vehicle on water or under water comprises a boat, a ferry, a hydrofoil, a catamaran, or a submarine. In other embodiments, the vehicle is above the ground. In some other embodiments, the vehicle above the ground comprises an airplane or a jet craft.

In another aspect, a vehicle comprises a physical energy conversion unit and a chemical energy conversion unit fluidically coupling with the physical energy conversion unit. In some embodiments, the physical energy conversion unit generates electricity when a fuel passing through the physical energy conversion unit. In other embodiments, the chemical energy conversion unit receives the fuel from the physical energy conversion unit. In some other embodiments, the chemical energy conversion unit comprises a combustion engine.

In another aspect, a method of powering a vehicle comprises generating a first amount of power by passing a fuel through a turbine generator and generating a second amount of power by combusting the fuel. In some embodiments, the method further comprises controlling a pressure of the fuel to drive the turbine generator. In other embodiments, the method further comprises controlling a temperature of the fuel to drive the turbine generator. In some other embodiments, the fuel is combusted in a combustion engine. In other embodiments, the fuel generates the first amount of energy by a physical state conversion and the second amount of energy by a chemical energy conversion. In some other embodiments, the vehicle comprises a land transportation vehicle, a water transportation vehicle, an air transportation vehicle, or a combination thereof.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure. More details of the methods of and devices for using the physical property and chemical property of a fuel to power a vehicle or machine are disclosed in the following.

Figure 1:
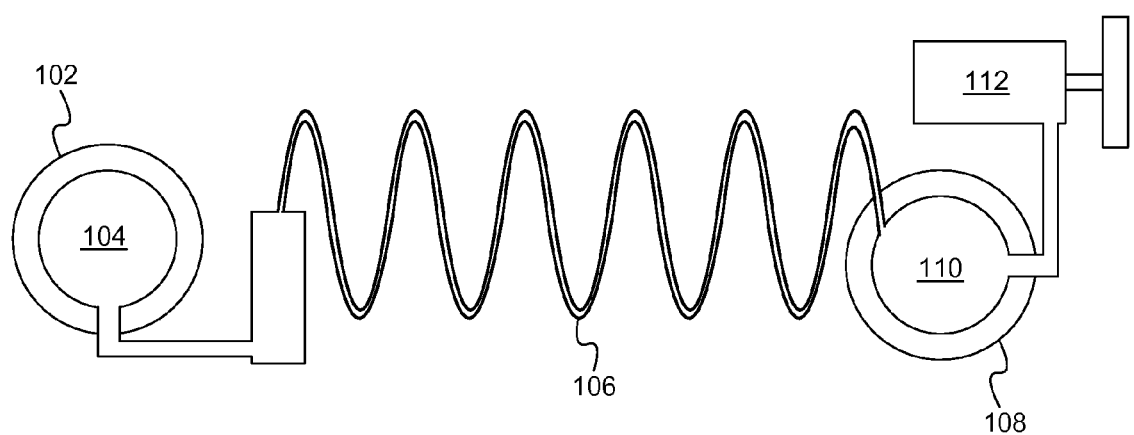
FIG. 1 shows a typical engine powered by a compressed and non-combustible liquid/gas.
Figure 2:
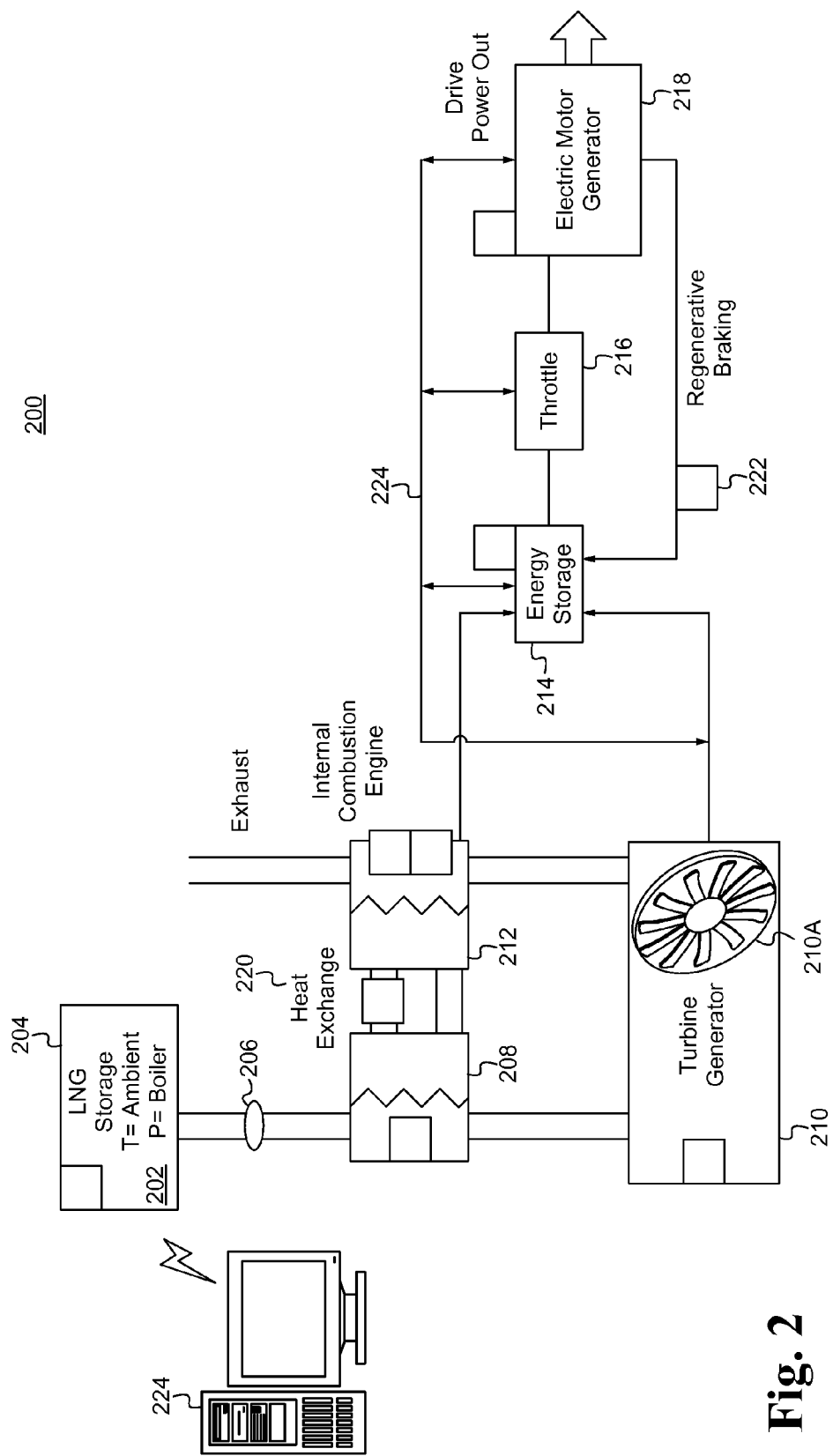
FIG. 2 illustrates a dual powering system in accordance with some embodiments of the present invention.

FIG. 2 illustrates a dual powering system 200 in accordance with some embodiments of the present invention. The system 200 is able to be used as the power generating part, such as an engine, of a motor. The motor is able to be used on a vehicle, such as a locomotive, car, truck, and any vehicle that can be operated with a power source. In some embodiments, the system 200 comprises a storage tank 204, a boiler 208, a turbine generator 210, a combustion engine 212, an energy storage 214, a throttle 216, a regenerative braking system 222, and an electric motor generator 218.

A fuel 202, such as natural gas, is added or pumped to and stored at the storage tank 204. In some embodiments, the storage tank is able to be a cryogenic tank. The term "fuel" used herein is able to refer to any materials that are capable of generating energy by lowering its internal energy in any physical states, such as liquid, solid, gas, supercritical fluid, or a combination thereof. In some embodiments, a liquefied fuel, such as a liquefied natural gas, is stored in the storage tank 204 at an ambient temperature and/or a pressure equal to the pressure at the boiler 208. A liquefied fuel is advantageous in a way that it has maximum energy density and fluidity in terms of usage convenience.

In some embodiments, the boiler is configured and controlled to have a pressure of the fuel in the range of 300-600 psi (pounds per square inch) with a use of the valve 206, which is referred as a bottoming cycle. In other embodiments, the pressure at the boiler 208 is controlled to be greater than 500 psi. A person of ordinary skill in the art appreciates that the pressures at the boiler 208 and at the storage tank 204 are able to be in any ranges so long as the pressure is able to be used to drive a turbine 210A to move and not greater than the safety pressure of the boiler 208 and the storage tank 204. In some embodiments, the boiler is heated by waste heat from the combustion engine 212 or turbine 210A via the heat exchanger 220. The use of the waste heat is able to avoid frosting and icing due to the loss of latent heat of vaporization of the fluid to gas transition.

The high pressure gas at the boiler 208 is transferred to the turbine generator 210 driving an alternator or generator (such as, the turbine 210A) to generate a controlled amount of electricity, which is able to be determined by a computerized system 224 having computer executable instructions to automatically control the needed electricity, such as a speed of a vehicle or a voltage needed at a predetermined time point or duration. In some embodiments, the electricity generated at the turbine generator 210 is used to drive/power a portion of the system 200 or the entire system 200 directly without prior storage through a power control and transmission system (such as the computerized system 224). In other embodiments, the electricity generated at the turbine generator 210 is stored at the energy storage 214, such as a battery array, before being used to drive/power a portion of or the entire system 200, including the electric motor generator 218. In some embodiments, the high pressure gas includes the fuel in a supercritical fluid state. In some embodiments, the pressure of the gas after running through one or more turbines in series or in parallel is able to be 125 psi. Using the high pressure gas to drive a turbine to generate electricity is able to be a process of a physical energy conversion, wherein a force is generated by passing a gas from a higher pressure state/location to a lower pressure state/location.

Next, the fuel at the turbine 210 at a reduced pressure is transferred to the combustion engine 212, which is able to be an internal or external combustion engine. The fuel in the combustion engine 212 generates electricity by converting its internal energy/combusting by driving an alternator or generator, which constitutes a chemical energy conversion. The electricity from the turbine generator 210 and the combustion engine 212 are able to be sent to the electric motor generator 218 to propel the vehicle and/or the batteries for a load leveling. In some embodiments, the regenerative braking 222 is an additional source of electricity to charge the batteries.

Figure 3:
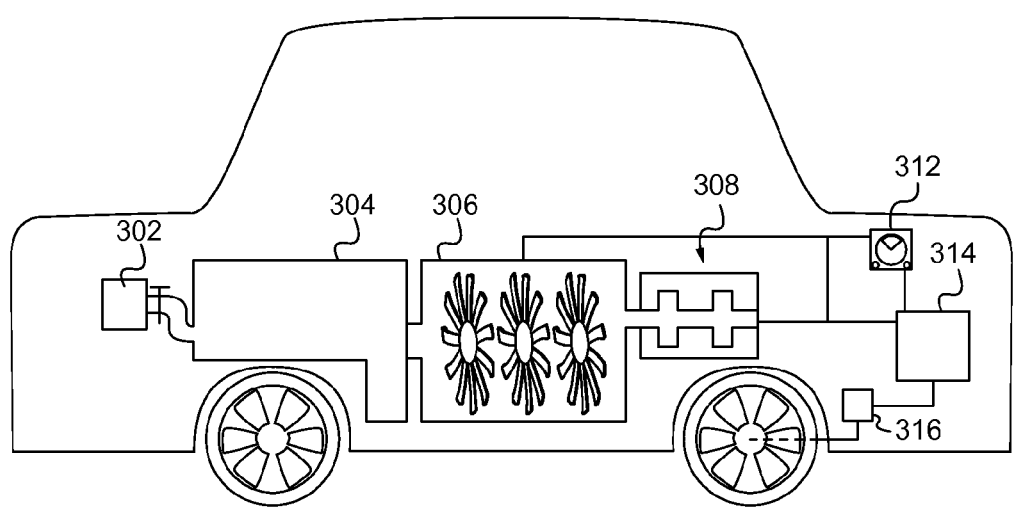
FIG. 3 illustrates a vehicle using the dual powering system in accordance with some embodiments of the present invention.

FIG. 3 illustrates a vehicle 300 using the dual powering system in accordance with some embodiments of the present invention. The liquefied fuel is able to be added/pumped through the opening 302. The fuel is able to be stored at the tank 304. The liquified fuel is expanded to be in a gas state to be passed through the one or more turbines 306, such that electricity is able to be generated. Next, the gas is passed to the combustion chamber 308 to chemically convert the chemical energy to electricity by a process of combustion. The energy generated at the turbine 306 and/or at the combustion chamber 308 is able to be stored at the battery set 314, to be used at the control panel 312, or to be used to drive the motor 316 for the movement of the vehicle 300.

Figure 4:
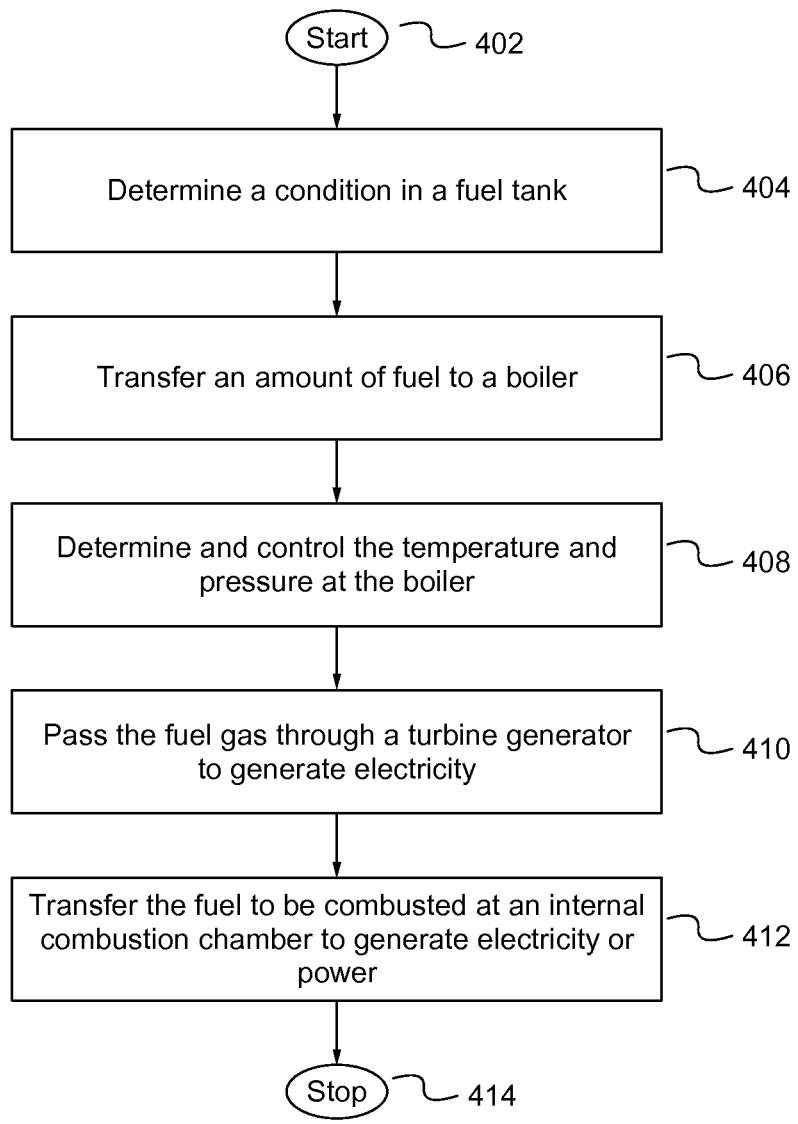
FIG. 4 is a flow chart illustrating a dual powering method in accordance with some embodiments of the present invention.

FIG. 4 is a flow chart illustrating a dual powering method 400 in accordance with some embodiments of the present invention. The method is able to begin at a step 402. At the step 404, a condition in the fuel tank is measured, such as temperature and pressure, such that the physical state (e.g., liquid or gas) of the fuel is able to be controlled and maintained. For example, a predetermined temperature (e.g., below 25° C.) and/or pressure (e.g., a greater than needed liquefying pressure at a current temperature) is able to be controlled and maintained. At the step 406, a predetermined amount of fuel is transferred to a boiler. The amount of fuel is able to be determined by the amount of fuel needed to reach a predetermined condition, such as a speed of a vehicle, average or peak energy needed. At the step 408, the temperature and pressure of the boiler are determined and controlled. The fuel in the boiler is controlled to have a pressure capable of driving a power generating turbine, such as greater than 500 psi. At the step 410, the fuel gas is passed through a turbine generator to generate an amount of power or electricity. The power or electricity is able to be used as a power source to propel a vehicle or stored in a form as an electricity to power an electrical component or electric motor. At the step 412, the fuel is transferred to be combusted at a combustion chamber/engine to generate electricity or power, which can be used as a source of electricity or power. The method is able to stop at a step 414.

Figure 5:
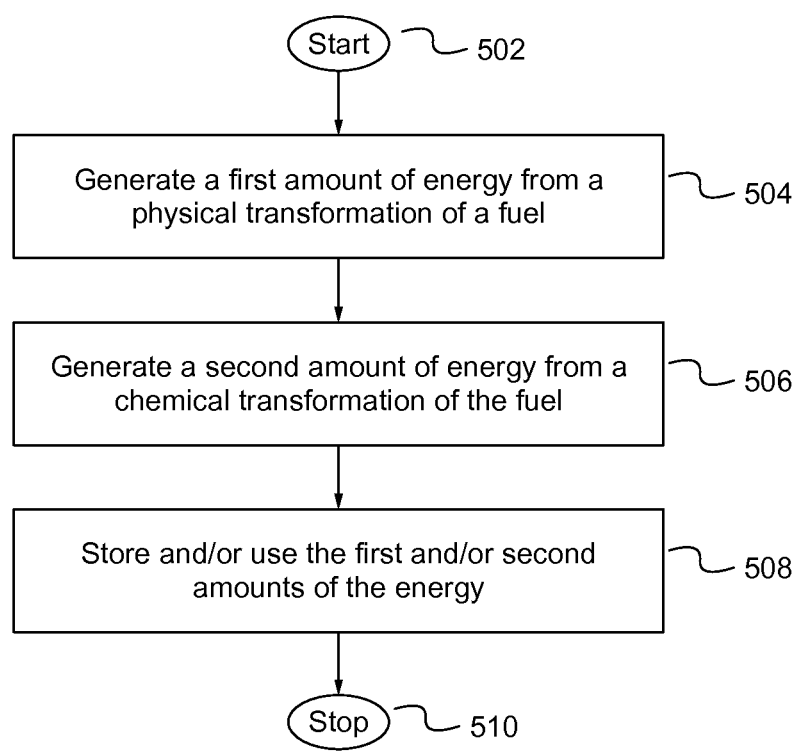
FIG. 5 is a flow chart illustrating an energy using method in accordance with some embodiments of the present invention.

FIG. 5 is a flow chart illustrating an energy using method 500 in accordance with some embodiments of the present invention. The method 500 is able to begin at a step 502. At the step 504, a first amount of energy is generated from a physical transformation of a fuel. The physical transformation includes phase transformations (such as vaporization, sublimation, melting, condensation, freezing, and deposition) and pressure changes (such as, pressure change while remaining in purely gas phase or with an expanded liquid). A person of ordinary skill in the art appreciates that the physical transformation is able to include all the changes of the physical properties, such as change of strength, change of durability, changes to crystal form, textural change, shape, size, color, volume and density or a combination thereof. At the step 506, a second amount of energy is generated from a chemical transformation of the fuel. The chemical transformation includes change of internal energy, change of chemical bonds (such as, bond formation, bond dissociation, and ionization), change of potential energy, or a combination thereof. At the step 508, the first and/or second amount of the energy generated are stored and/or used. The above is an example of the energy generation by dual transformation. Other sequences or combinations are within the scope of the present invention. For example, a chemical transformation of the energy is able to be performed before the physical transformation of the energy. More than twice conversions of the fuel are within the scope of the present invention, such as a first physical energy conversion, a second physical energy conversion, and followed by a first and a second chemical energy conversion.

To utilize the dual powering system, a fuel's physical and chemical properties are both changed to generate an amount of force or electricity, such that the fuel is able to be used at least twice to generate energy needed. The systems and methods are advantageous in many aspects including that the system and method are able to generate more energy for each unit amount of the fuel comparing to the typical engines. The present invention is able to be used at a Stationary Engine working on liquid nature gas, which can be a fuel for Peakers (Peaking Power Plant).

In operation, a fuel is adjusted to have a predetermined pressure, passed through a power generation turbine, and transported to a combustion chamber to further generate more energy. The energy is able to be stored or used to power a movement of a motor vehicle.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications are able to be made in the embodiment chosen for illustration without departing from the spirit and scope of the invention as defined by the claims.

What is claimed is:

1. A vehicle comprising:
   a. a fuel storage;
   b. a fluid driven generator fluidically coupling with the fuel storage, wherein the fluid driven generator is driven by a pressurized fuel;
   c. a chemical energy converter fluidically coupling with the fluid driven generator, wherein the fuel storage is configured to store a liquified fuel that is used to generate the pressurized fuel, including pressurizing the fuel storage to prevent a change of a physical state of the liquified fuel while the liquified fuel is in the fuel storage; and
   d. a boiler to regulate a pressure of the pressurized fuel, wherein the boiler is heated by waste heat from the chemical energy converter or the fluid driven generator.

2. The vehicle of claim 1, wherein the fluid driven generator comprises one or more turbines.

3. The vehicle of claim 1, wherein the fluid driven generator generates electricity when receiving a fluid flow.

4. The vehicle of claim 3, wherein the fluid flow comprises a gas.

5. The vehicle of claim 3, wherein the fluid flow is driven by a pressure difference.

6. The vehicle of claim 1, wherein the fluid driven generator, the chemical energy converter, or a combination thereof provides an energy sufficient to move the vehicle.

7. The vehicle of claim 1, wherein the chemical energy converter comprises a combustion engine.

8. The vehicle of claim 7, wherein the combustion engine makes a moving motion of the vehicle by combusting a fuel.

9. The vehicle of claim 1, wherein the vehicle comprises a land transportation vehicle.

10. The vehicle of claim 9, wherein the land transportation vehicle comprises a sedan, a pick-up, a SUV, or a hybrid vehicle.

11. The vehicle of claim 9, wherein the land transportation vehicle comprises a truck or a train.

12. The vehicle of claim 1, wherein the vehicle comprises a public transportation vehicle.

13. The vehicle of claim 12, wherein the public transportation vehicle comprises a shuttle, a bus, or a light rail train.

14. The vehicle of claim 12, wherein the public transportation vehicle comprises an underground system.

15. The vehicle of claim 14, wherein the underground system comprises a subway.

16. The vehicle of claim 1, wherein the vehicle comprises a vehicle on water or under water.

17. The vehicle of claim 16, wherein the vehicle on water or under water comprises a boat, a ferry, a hydrofoil, a catamaran, or a submarine.

18. The vehicle of claim 16, wherein the vehicle is above the ground.

19. The vehicle of claim 16, wherein the vehicle above the ground comprises an airplane or a jet craft.

20. The vehicle of claim 1, wherein the boiler is between the fuel storage and the fluid driven generator.

21. A system comprising:
   a. a physical energy conversion unit, wherein the physical energy conversion is driven by a pressurized fuel;
   b. a chemical energy conversion unit fluidically coupled with the physical energy conversion unit;
   c. a fuel storage unit configured to store a liquified fuel that is used to generate the pressurized fuel, including pressurizing the fuel storage unit to prevent a change of a physical state of the liquified fuel while the liquified fuel is in the fuel storage unit; and
   d. a boiler to regulate a pressure of the pressurized fuel, wherein the boiler is heated by waste heat from the chemical energy conversion unit or the physical energy conversion unit.

22. The system of claim 21, wherein the physical energy conversion unit generates electricity when a fuel passing through the physical energy conversion unit.

23. The system of claim 21, wherein the chemical energy conversion unit receives the fuel from the physical energy conversion unit.

24. The system of claim 21, wherein the chemical energy conversion unit comprises a combustion engine.

25. The system of claim 21, wherein the system is part of a power plant.

26. The system of claim 21, wherein the boiler is between the fuel storage and the physical energy conversion unit.

27. A method of powering a vehicle comprising:
   a. generating a first amount of power by passing a pressurized fuel through a turbine generator;
   b. generating a second amount of power by combusting the fuel, wherein the pressurized fuel is generated by a liquified fuel stored in a fuel storage, wherein the fuel storage is pressurized to prevent a change of a physical state of the liquified fuel while the liquified fuel is in the fuel storage; and
   c. using waste heat from the turbine generator or a combustion engine heating a boiler to regulate a pressure of the pressurized fuel.

28. The method of claim 27, further comprising controlling a pressure of the fuel to drive the turbine generator.

29. The method of claim 27, further comprising controlling a temperature of the fuel to drive the turbine generator.

30. The method of claim 27, wherein the fuel is combusted in a combustion engine.

31. The method of claim 27, wherein the fuel generates a first amount of energy by a physical state conversion and a second amount of energy by a chemical energy conversion.

32. The method of claim 27, wherein the vehicle comprises a land transportation vehicle, a water transportation vehicle, an air transportation vehicle, or a combination thereof.

33. The system of claim 27, wherein the boiler is between the fuel storage and the turbine generator.

* * * * *